United States Patent
Swan

(10) Patent No.: US 7,471,881 B2
(45) Date of Patent: Dec. 30, 2008

(54) SYSTEM FOR PARKING A DRIVE IN A VIDEO RECORDER

(75) Inventor: Paul R. Swan, Milpitas, CA (US)

(73) Assignee: LSI Corporation, Milpitas, CA (US)

( * ) Notice: Subject to any disclaimer, the term of this patent is extended or adjusted under 35 U.S.C. 154(b) by 657 days.

(21) Appl. No.: 11/063,172

(22) Filed: Feb. 22, 2005

(65) Prior Publication Data

US 2006/0190753 A1 Aug. 24, 2006

(51) Int. Cl.
*H04N 5/76* (2006.01)

(52) U.S. Cl. .......................................... 386/125; 360/75

(58) Field of Classification Search ............... 369/47.11; 725/46, 131; 386/95, 46, 125, 126; 717/170; 360/75, 256, 254.3
See application file for complete search history.

(56) References Cited

U.S. PATENT DOCUMENTS

| | | | | |
|---|---|---|---|---|
| 4,987,486 A | * | 1/1991 | Johnson et al. | 725/131 |
| 5,495,376 A | * | 2/1996 | Wasson et al. | 360/75 |
| 6,198,603 B1 | * | 3/2001 | West | 360/256 |
| 6,958,880 B2 | * | 10/2005 | Lee et al. | 360/75 |
| 2001/0033459 A1 | * | 10/2001 | Boutaghou | 360/254.3 |
| 2003/0061604 A1 | * | 3/2003 | Elcock et al. | 717/170 |
| 2005/0028205 A1 | * | 2/2005 | Nishimura et al. | 725/46 |
| 2005/0069294 A1 | * | 3/2005 | Tagawa et al. | 386/95 |
| 2005/0264914 A1 | * | 12/2005 | Kusumoto | 360/75 |
| 2005/0270936 A1 | * | 12/2005 | Miyano | 369/47.11 |

\* cited by examiner

*Primary Examiner*—David E Harvey
(74) *Attorney, Agent, or Firm*—Christopher P. Maiorana, PC

(57) ABSTRACT

A method for parking a drive in a video recorder comprising the steps of (A) applying main power to the video recorder, (B) parking the drive in response to applying main power to the video recorder, (C) placing the video recorder in a standby mode, (D) presenting a user with a setup request to (i) setup the video recorder in the standby mode or (ii) enter into a normal mode, (E) if the user selects to setup the video recorder, continue parking the drive, and (F) if the user selects to enter into the normal mode, unparking the drive to allow the video recorder to access the drive.

20 Claims, 4 Drawing Sheets

SYSTEM FOR PARKING A DRIVE IN A VIDEO RECORDER

FIELD OF THE INVENTION

The present invention relates to video recorders generally and, more particularly, to a hard disk drive deferred boot while a user performs a setup on the video recorder.

BACKGROUND OF THE INVENTION

Operating drives in video recorder are susceptible to damage from motion and shock. In this industry, there is a rush to fast boot a drive as soon as possible. However, shock occurring during installation to drives have been overlooked. In consumer products, moving the product during installation and configuration is not uncommon. If the motion or shock to the drive is moderate, transient errors may occur leading to initial problems. Harder shocks to drives may introduce permanent defects that may result in unstable performance and lead to a warranty claim or usability degradation. Still harder shocks to drives may be entirely fatal, leading to a warranty claim. The aim is to reduce warranty claims due to drive failures.

Most video recorders are exposed to some degree of shock during installation. Particularly when the video recorder is on an enclosed shelf with hidden cables. It is difficult to disconnect a video recorder from main power without moving the video recorder since the power connector is normally located in the rear of the video recorder. Therefore, as soon as power is connected to the video recorder, the disc is activated and subject to damage caused by motion.

It would be desirable to automatically park a drive in a video recorder prior to installing or setting up the video recorder.

SUMMARY OF THE INVENTION

The present invention concerns a method for parking a drive in a video recorder comprising the steps of (A) applying main power to the video recorder, (B) parking the drive in response to applying main power to the video recorder, (C) placing the video recorder in a standby mode, (D) presenting a user with a setup request to (i) setup the video recorder in the standby mode or (ii) enter into a normal mode, (E) if the user selects to setup the video recorder, continue parking the drive, (F) if the user selects to enter into the normal mode, unparking the drive to allow the video recorder to access the drive.

The objects, features and advantages of the present invention include providing video recorder that (i) parks a drive when main power is first applied, (ii) keeps the driver parked until the recorder is configured, (iii) allows the unit to be moved before the drive is activated and/or (iv) automatically parks the drive when a user selects to configure the video recorder.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
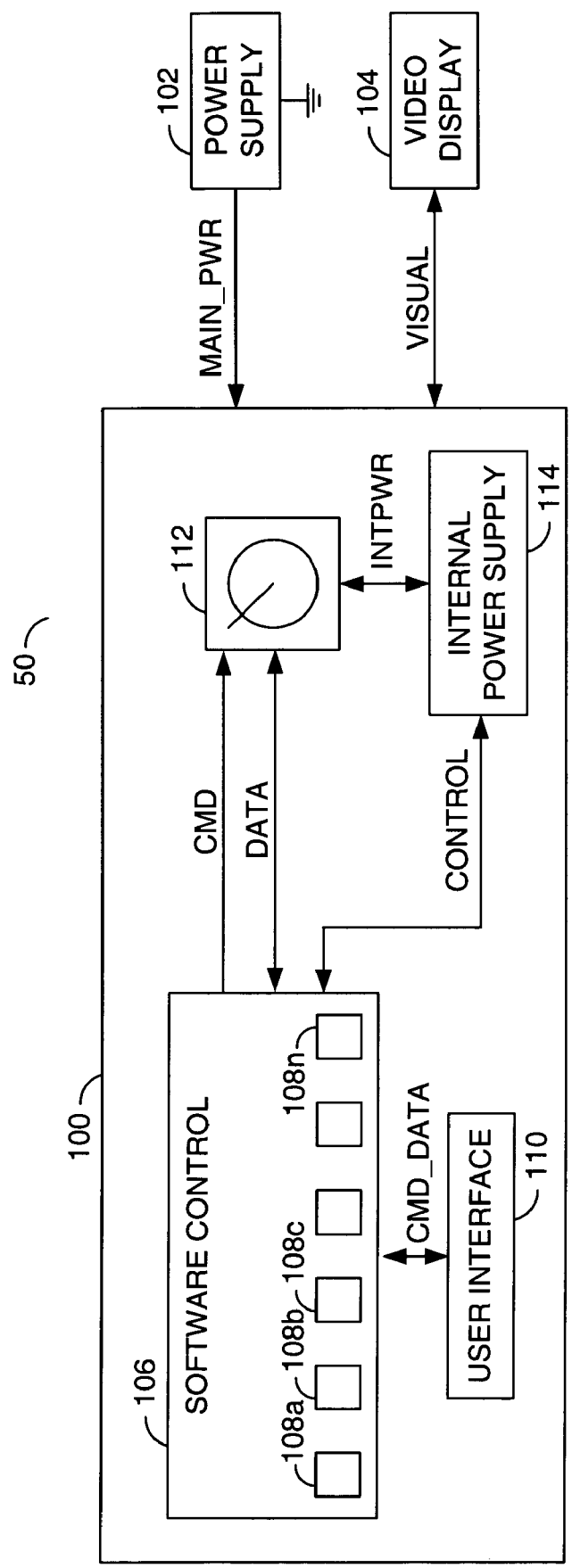
FIG. 1 is a diagram illustrating an embodiment of the present invention.

Referring to FIG. 1, a block diagram of an example implementation of a system 50 is shown. The system generally comprises a block 100, a block 102 and a block 104. The block 100 may be implemented as a video recorder (or a personal video recorder). The block 102 may be implemented as a power supply. The block 104 may be implemented as a video display. The video recorder 100 generally includes a software control routine 106. The software control routine 106 generally includes a number of software modules 108a-108n. Each software module 108a-108n may include a software program configured to provide a specific function. While six software modules 108a-108n are shown, the particular number of software modules 108a-108n may be varied to meet the design criteria of a particular implementation. While a number of software modules 108a-108n are shown, a single module may be implemented to perform all of the needed functions. However, by implementing some functions separately, the present invention may be more easily integrated into the control software of more than one vendor.

While each of the software modules 108a-108n is shown in a software control routine 106, any one of the software modules 108a-108n may be implemented in one or more separate software control routines. Each of the separate software control routines may be incorporated into a single chip, or may be implemented on different modular chip sets each configured to perform specific functions. Alternatively; each of the software modules 108a-108n may be implemented as a subroutine within the software control routine 106. This type of design allows for specific chip sets to perform specialized functions. Such an implementation may allow the present invention to be implemented without disturbing other modules within the software control routine 106. By implementing the present invention with a modular approach, vendors may be more likely to implement the present invention in current designs.

One of the software modules 108a-108n may include a software program configured to allow a user to play, rewind, forward, pause, etc. various digital medium recorded on the video recorder 100. One of the software modules 108a-108n may include a software program configured to allow a user to program recording times of digital medium. One of the software modules 108a-108n may include a program associated with setting up the video recorder 100 (e.g., date/time, language, etc.). One of the software modules 108a-108n may include a program which detects when main power has been applied to the video recorder 100 for the first time.

The video recorder 100 generally includes a user interface 110. The user interface 110 may include a keypad (such as a wireless keyboard) or a remote control. The user may respond or initiate communication with the video recorder 100 through the user interface 110. A signal (e.g., CMD_DATA) may transfer data items to and from the software modules 108a-108n. The video recorder 100 generally includes a drive 112 and an internal power supply 114. The driver 112 may be implemented as a hard disc drive (HDD) or other storage medium. The driver 112 may be implemented as a single drive or as a plurality of drives configured to work together to provide additional storage capabilities beyond a single drive. Additionally, the system 50 may be implemented to use one of a plurality of drive(s) 112 by using a switching device.

One or more signals (e.g., DATA) may exchange the data items between the drive 112 and the software control routine 106. The data items within the signal DATA may be arranged in blocks, segments or other configurations. A signal (e.g., CMD) may be a signal generated by the software control modules 108a-108n and sent to the drive 112. A signal (e.g., INTPWR) is normally supplied to the drive 112 by the internal power supply 114. The signal INTPWR may be in the form of a voltage. A signal (e.g., CONTROL) may also be supplied to the drive 112 by the software control routine 106. If the drive 112 is internal to the video recorder 100, the software modules 108a-108n may have direct control over the internal power supply 114 through the signal CONTROL. The software modules 108a-108n may park the drive 112 by disabling the internal power supply 114 through the signal CONTROL. The software modules 108a-108n may also unpark the drive 112 by enabling the internal power supply through the signal CONTROL. One of the software modules 108a-108n may issue the signal CMD to park or unpark the drive 112. The drive 112 is generally configured to support the signal CMD from the software modules 108a-108n to facilitate parking or unparking;

A signal (e.g., MAIN_PWR) may be supplied to the video recorder 100 by the power supply 102. The signal MAIN_PWR may be in the form of a voltage. A signal (e.g., VISUAL) may transfer visual data from the video recorder 100 to the visual display 104. The visual data may include information related to the video recorder setup, time/date information, and personal recorder status (e.g., play, rewind, fast-forward, etc.). The type of visual data presented to the user may vary to meet the design criteria of a particular information.

Figure 2:
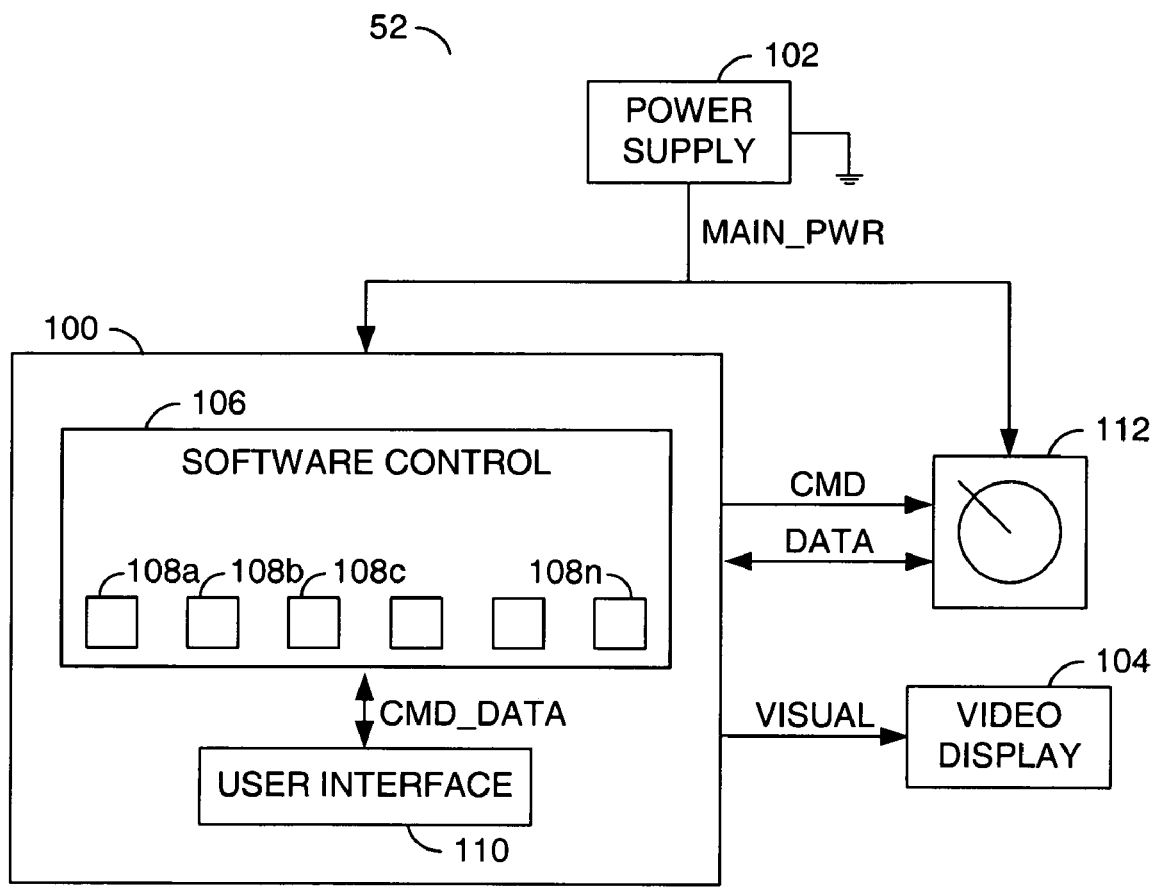
FIG. 2 is a diagram illustrating another embodiment of the present invention.

Referring to FIG. 2, a system 52 is shown implementing another embodiment of the present invention. The video recorder 100 generally includes the software control routine 106 and the user interface 110. In the system 52, the drive 112 may be implemented externally to the video recorder 100. One or more drives 112 may be implemented to meet the design criteria of a particular implementation. A combination of internal and external drives may also be implemented. The signal MAIN_PWR is presented to the video recorder 100 and the drive 112. If the drive 112 is implemented external to the video recorder 100, the drive 112 will go into the parked state in response to the signal CMD. The software modules 108a-108n will issue the signal CMD to park or unpark to the drive 112 since the power supply 102 cannot be controlled by the video recorder 100. Regardless of whether the drive 112 is external or internal to the video recorder 100, the drive 112 is configured to receive the signal CMD from the software modules 108a-108n.

Figure 3:
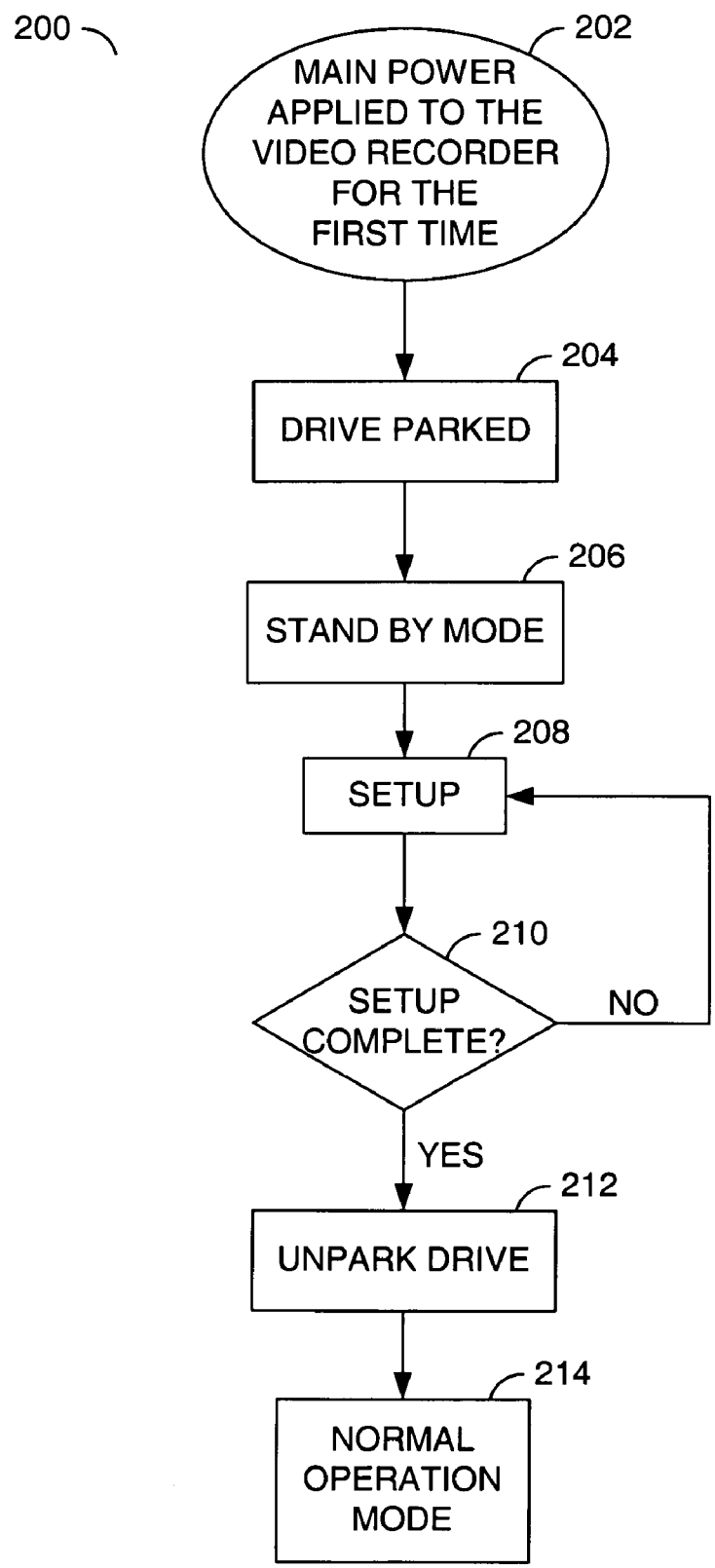
FIG. 3 is a flow diagram illustrating the application of main power to video recorder for the first time.

Referring to FIG. 3, a flow diagram of a process 200 is shown in accordance with a preferred embodiment of the present invention. The process 200 may implement a first time deferred boot process when main power is applied to the video recorder 100 for the first time. The process 200 generally applies to video recorders 100 for initiating a setup when main power is applied to the video recorder 100 for the first time. Such a setup may include features other than the drive park operation of the present invention (e.g., satellite setup, channel setup, etc.). However, not all video recorders enter a setup mode when main power is applied to the video recorder 100 for the first time. The process 200 generally comprises a state 202, a state 206, a state 208, a state 208, a decision state 210, and a state 212. The state 202 generally applies main power from the power supply 102 to the video recorder 100 for the first time. The state 204 parks the drive 112 in response to one of the software modules 108a-108n detecting that main power has been applied to the video recorder 100 for the first time. The state 206 places the video recorder 206 in stand by mode.

The state 208 moves the video recorder 100 from stand by mode to a setup mode when the user has turned the video recorder 100 on. The user may use the remote control or the keypad which is part of the user interface 110 to turn the video recorder 100 on. In state 208, the user is prompted to perform a setup through the video display 104. In one example, the user may also be prompted to perform a setup after depressing a setup key on the remote control or the keypad.

A setup request may be generated from the software modules 108a-108n and sent to the video display 104. For example, the setup request may include an initial logo screen displayed on the video display 104 and the user may select either of the prompts "(1) setup the video recorder 100" or "(2) continue to a main menu". Variations of the prompts may be implemented as needed. During the setup, the user may install and configure the video recorder 100 by verifying various video/audio inputs and outputs. The user may also perform a quick channel scan to verify an antenna signal. The user is also free to move the personal recorder 100 without damaging the drive 112 while the drive 112 is parked.

The decision state 210 determines if the setup is complete. If so, the process 200 moves to state 212 to unpark the drive 112. After unparking the drive 112, the process 200 moves to the state 214 and the user may use the video recorder 100 in a normal operating mode. The software control routine 106 is free to access data on the drive 112. To indicate that the setup is complete, the user will select prompt (2) continue to a main menu. If the setup is not complete, the process 200 moves back to state 208.

Figure 4:
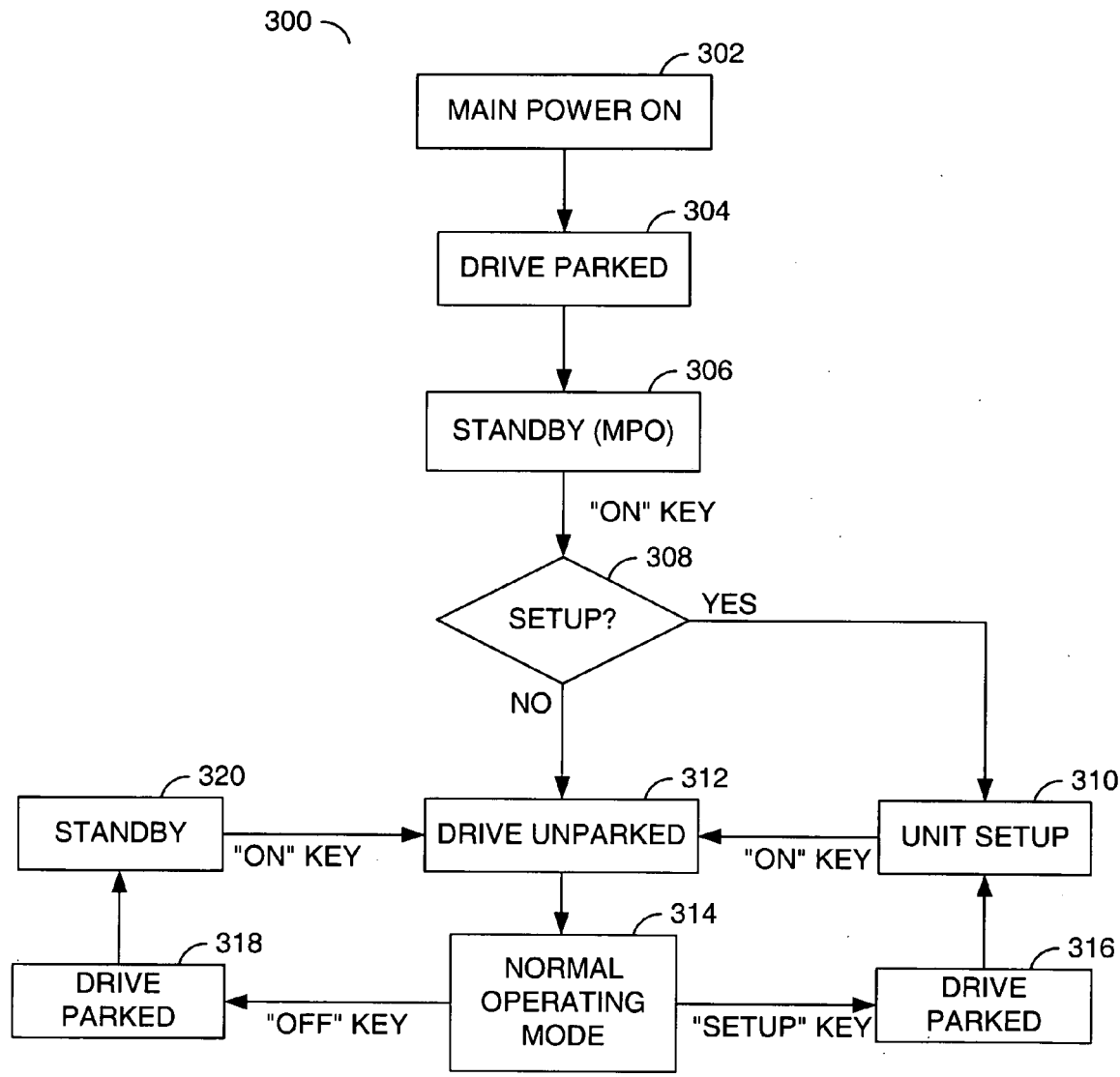
FIG. 4 is a flow diagram illustrating a power up and standby state transmission sequence of a video recorder.

Referring to FIG. 4, a flow diagram of a process 300 is shown. The process 300 may implement a deferred drive boot setup process. The process 300 may be started in response to a request from a user after a video recorder 100 after an initial setup. The process 300 may be started in response to a request from the user in video recorders 100 that do not implement an initial setup. The process 300 generally comprises a state 302, a state 304, a state 306, a decision state 308, a state 310, a state 312, a state 314, a state 316, a state 318, and a state 320. The state 302 generally applies main power from the power supply 102 to the video recorder 100. The state 308 moves the video recorder 100 from stand by mode to a setup mode when the user has turned the video recorder 100 on.

In state 308, the user is prompted to perform a setup through the video display 104. The user may also be prompted to perform a setup after depressing a setup key (if available) on the remote control or the keypad. The setup request may be generated from the software modules 108a-108n and sent to the video display 104. The setup request will prompt the user to select to either (1) setup the video recorder 100 or (2) continue to a main menu. The state 310 will allow the user to setup the video recorder 100 in response to the user selecting to enter the setup mode. The state 312 will unpark the drive when the user has completed the setup. To indicate that the setup is complete, the user will select prompt (2) continue to a main menu. The state 314 will place the video recorder 100 into a normal operating mode. The state 316 will park the drive 112 in response to a setup key being pressed either on the remote control or on the keypad. The process 300 moves back to state 310 to allow the user to setup the video recorder 100. The state 312 will unpark the drive 112 and move to state 314. The state 318 will park the drive 112 when the user has turned the recorder 100 off. If the video recorder 100 is turned on, the state 312 will unpark the drive 112. The process 300 then moves to state 314 where the video recorder 100 will be placed in the normal operating mode.

The function performed by flow diagrams of FIGS. 3-4 may be implemented on any product containing a fragile disk requiring external connections during setup. Such devices are often referred to as Personal Video Recorders (PVR) or Digital Video Recorders (DVR). Such devices may include high definition television (HDTV) recorders, over the air (OTA), cable, and satellite receivers. The present invention may be extended to include an option to allow a user to park a drive on command. For example, one of more of the electronic devices may allow a drive to continuously run at all times. This may create excessive noise. If a user is only using the device as a receiver, the drive 112 may not be needed. The user has the option to park the drive on command to eliminate the noise when the drive 112 is not being used.

The present invention is particularly useful during the installation and connecting of cables (often at the back) of a video recorder. Instead of immediately activating the hard drive when the main power turns on, the present invention holds the drive in parked (or spun down) mode until the consumer has explicitly installed and configured (e.g., setup) the unit. The process may begin when the main power turns on or by an explicit user request to install and configure the unit. The setup process of the present invention would otherwise be skipped when the unit is activated from a standby mode. The majority of consumers leave their units powered on continuously. Leaving the power on facilitates timer recordings. The additional step of the present invention during a main power on should not be too disadvantageous.

The initial state of the HDD is parked state until the main power is turned on. The parked state may be achieved by either configuring drive 112 to power up in a spun down state or may be triggered by the software control 106.

The present invention may be configured to skip the setup by providing a configuration option to disable such setup on a subsequent cold power boot. Skipping the setup may be implemented as a consumer convenience feature. An automatic unit activation from standby may also be implemented as a result of an existing timer recording.

In general, any unit activation/deactivation method may be used, for example, a single "standby/on" key on a remote control or the units front panel may be implemented. A "SETUP" key may be implemented to initiate the installation and configuration of the unit at the request of a user (or consumer).

The function performed by the flow diagrams of FIGS. 3-4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for parking a drive in a video recorder, comprising the steps of:
    (A) connecting said video recorder to a power outlet;
    (B) parking said drive in response to connecting said video recorder to said power outlet;
    (C) automatically placing said video recorder in a standby mode;
    (D) automatically presenting a user with a setup request to (i) setup said video recorder or (ii) enter into a normal operating mode;
    (E) if said user selects to setup said video recorder, continue parking said drive; and
    (F) if said user selects to enter into said normal operating mode, unparking said drive to allow said video recorder to access said drive.

2. The method according to claim 1, further comprising the step of:
    if said video recorder is connected to said power outlet for a first time, parking said drive to allow said user to setup said video recorder before unparking said drive.

3. The method according to claim 1, wherein step (F) further comprises:
    monitoring whether said user has moved said video recorder from said normal operating mode to (i) said standby mode or (ii) an off-mode.

4. The method according to claim 3, further comprising the step of:
    parking said drive when said video recorder moved from said normal operating mode to (i) said standby mode or (ii) said off-mode.

5. The method according to claim 4, further comprising the steps of:
    unparking said drive when said video recorder is moved from (i) said standby mode or (ii) said off-mode back to said normal operating mode.

6. The method according to claim 1, further comprising the step of:
    checking one or more connections to said video recorder while said drive is parked.

7. The method according to claim 6, further comprising the step of:
    allowing said user the ability to lift or move said video recorder while said drive is parked.

8. The method according to claim 1, wherein step (B) is further comprises:
    parking said drive with a controllable power supply if said drive and said controllable power supply are internal to said video recorder.

9. The method according to claim 1, wherein step (D) further comprises:
    presenting said user with said setup request through a video display.

10. The method according to claim 1, wherein said drive is implemented as a plurality of drives that are each parked in response to connecting said video recorder to said power outlet.

11. The method according to claim 10, wherein said drive comprises a hard disk drive configured to be parked in response to connecting said video recorder to said power outlet.

12. The method according to claim 1, wherein step (E) further comprises:
selecting to setup said video recorder with a remote control.

13. The method according to claim 1, wherein step (F) further includes:
allowing said user to resume normal operation of said video recorder.

14. The method according to claim 1, further comprising the step of:
automatically initiating to setup of said video recorder if said video recorder is connected to said rower outlet for a first time, in response to a first boot.

15. The method according to claim 14, further comprising the step of:
parking said drive in response to automatically initiating setup of said video recorder.

16. The method according to claim 1, wherein step (B) further comprises:
issuing a command from one or more software modules to said drive.

17. The method according to claim 16, further comprising the step of:
issuing said command from said software modules to an external drive.

18. An apparatus comprising:
a video recorder comprising (i) one or more software modules and (ii) a drive, wherein:
said drive is configured to receive and transmit a video data signal in response to one or more signals received from one or more of said software modules;
one of said signals comprises a command configured to park said drive in response to either (i) a user selecting to setup said video recorder when in a first mode and (ii) said video recorder being connected to a power outlet for the first time when in a second mode; and
said recorder automatically presents a setup request in response to said recorder being connected to said power outlet.

19. The apparatus according to claim 18, further comprising an internal power supply configured to park said drive in response to a control signal.

20. The apparatus according to claim 18, wherein said drive comprises an external drive.

* * * * *